United States Patent Office 2,872,369
Patented Feb. 3, 1959

2,872,369

VINYL LOWER ALKYL ETHER-MALEIC ANHYDRIDE COPOLYMER AS A PESTICIDE SOLUBILIZER

Gerald Robinson, Forest Hills, N. Y., assignor to General Aniline & Film Corporation, New York, N. Y., a corporation of Delaware No Drawing. Application May 14, 1956
Serial No. 584,414

11 Claims. (Cl. 167—42)

This invention relates to new compositions of matter and in particular to polymers containing compositions which exhibit unusual and unexpected properties, especially in so far as they have the ability to render soluble or increase the solubility of normally insoluble or difficultly soluble compounds in polar solvents.

In recent years one of the outstanding techniques employed for the dissemination and application of coating materials, sprays and the like has been the so-called aerosol technique. Basically the aerosols are prepared by dissolving the compounds to be applied or sprayed in a "propellant." Usually, the propellants are the low boiling liquids of the Freon type. The mixture is confined within a restricted container and upon release of a suitable valve means or the like, the propellant by virture of its physical properties is forced with its dissolved materials out of the container. By such a process it is particularly advantageous to apply to surfaces innumerable types of materials or to disseminate various substances in the atmosphere. Today literally thousands of materials are packaged as aerosols. In order, however, to be able to formulate such compositions it is necessary that the material which it is desired to apply, spray or disseminate, be soluble in the propellant or in some solvent which is soluble in the propellant and which combination yields a homogeneous solution. Many materials which would lend themselves from a commercial point of view to be extremely desirable as aerosols have heretofore not been so employed because they either are not soluble in the usual propellants or in ethyl alcohol which is the practically universally employed solvent adjuvant. Since, therefore, the compounds must exhibit solubility either in alcohol or in the propellant or in the combination of alcohol and propellant, it is not found practical or indeed possible to formulate aerosol compositions with many other types of compounds.

Among the classes of materials which are particularly adaptable for use in aerosol formulation, if such formulations can be accomplished, are fungicides, bactericides, herbicides, and the like. In view of the fact that many of these classes of materials are somewhat toxic and/or dangerous to handle, the aerosol technique is particularly attractive to the ultimate user of such materials.

It is therefore an object of this invention to provide new and useful compositions which may be employed to effect the solubilization or to increase the solubility of compounds in polar solvents.

It is a further object of this invention to provide a polymer containing composition, and in particular the partial alkyl esters of a copolymer of vinyl alkyl ether and maleic anhydride which have the unexpected property of solubilizing or increasing the solubility of heavy metal containing compounds or sulfur containing compounds in polar solvents, and in particular in ethyl alcohol.

It is a still further object of this invention to provide a new process whereby compounds which are normally insoluble in selected polar solvents are rendered soluble or more soluble therein.

It is still another object of this invention to provide a new process whereby heavy metal containing or sulfur containing compounds may be rendered soluble or more soluble in ethyl alcohol employing partial lower alkyl esters of a copolymer of a vinyl lower alkyl ether and maleic anhydride.

These and other objects of the present invention will appear from the following description. The objects of this invention are achieved through the unexpected and unusual properties possessed by the partial lower alkyl esters of the copolymers of vinyl lower alkyl ethers with maleic anhydride, which esters have been rendered "stabilized." By the latter term is meant that the copolymeric esters exhibit a pH of at least 6.5. Since the copolymers per se are rather acidic in nature, it is necessary in order to achieve the desired degree of stabilization to employ a base to effect said stabilization. The basic materials which may be employed in the preparation of the compositions of this invention include the following: amines such as methylamine, ethylamine, diethylamine, dimethylamine, triethylamine, sodium methylate, sodium ethylate, and the like.

The copolymers of vinyl lower alkyl ethers with maleic anhydride which may be employed in the preparation of the partial esters useful in the practice of this invention are those which contain in the vinyl ether moiety thereof lower alkyl groups of from 1 to 4 carbon atoms, and particularly the methyl vinyl ether and the ethyl vinyl ether. The contemplated copolymers may be represented by the following structural formula:

$$\left[ -CH_2-CH-CH-CH- \atop \phantom{-CH_2-CH-}\overset{OR}{|}\phantom{-}\overset{|}{O=C}\underset{O}{\diagdown\diagup}C=O \right]_n$$

wherein R is a lower alkyl radical of 1 to 4 carbon atoms and preferably methyl or ethyl, and $n$ has a value of at least 5. Such copolymers have molecular weights ranging from about 800 to upwards of about 10,000 or more. Such copolymers are in general characterized by having specific viscosities ranging from about 0.2 to 3.0. The viscosity determination is made using 1 gram sample of the material in 100 ml. of 2-butanone at 25° C. Viscosity measurements are commonly used as an indication of the average molecular weight of polymeric compositions. The K value (Fikentscher) of any particular mixture of polymers is calculated from viscosity data and is useful as an indication of the average molecular weight of such mixture. The determination of the K value is fully described in "Modern Plastics," vol. 23, No. 3, pp. 157–61, 212, 214, 216 and 218 (1945), and is defined as 1000 times $k$ in the empirical relative viscosity equation:

$$\frac{\log_{10} \mu_{rel.}}{C} = \frac{75k^2}{1+1.5kC}+k$$

wherein C is the concentration in grams per 100 cc. polymer solution and $\mu_{rel.}$ is the ratio of viscosity of solution to that of pure solvent. The K values are reported as 1000 times the calculated viscosity coefficient in order to avoid the use of decimals.

K values and specific viscosities ($\mu_{sp.}$) are interconvertible and are related through relative viscosity ($\mu_{rel.}$). Thus, when viscosity measurements are taken on solutions which have a concentration of 1.00 g. polymer per deciliter of solution at 25° C. ($C=1$), the relations are as follows:

(1) $\mu_{rel.} = \mu_{sp.}+1$
(2) Relative viscosity=specific viscosity+1
(3) Relative viscosity=10 $[0.001K+0.000075K^2/(1+.0015K)]$
(4) $\mu_{sp.} = -1+10 \ [0.001K+0.000075K^2/(1+.0015K)]$ Relative viscosity, specific viscosity, and K are dimensionless, whereas inherent viscosity ($\log_e \mu_{rel.} \div C$) and intrinsic viscosity (the limit of inherent viscosity as C approaches 0) have the dimensions of dilution, that is, the reciprocal of concentration. Intrinsic viscosity and K are intended to be independent of concentration.

The partial esters which are contemplated in this invention are those lower alkyl esters having from 1 to 4 carbon atoms in the alkyl radical thereof such as methyl, ethyl, normal propyl, isopropyl, normal butyl, isobutyl, and tertiary butyl, and of particular suitability are partial methyl and ethyl esters. The aforementioned esters are in general prepared by the interaction of the unesterified copolymer with the corresponding alcohol. The methyl and ethyl esters are of particular desirability since they may be readily formed merely by dissolving the unesterified copolymer in methyl and ethyl alcohols, respectively. Upon dissolution the corresponding partial ester is formed in situ. The other esters such as the propyl and butyl esters may be prepared in a similar manner and it is advisable, in order to facilitate the formation of these esters, to add heat to the system. The amount of ester groups present in the partially esterified copolymer should range from about 35 to 50% of the total number of acid groups originally present in the unesterified copolymer. By dissolving the copolymer of vinyl methyl ether with maleic anhydride in either methyl or ethyl alcohol, one may obtain directly the corresponding partial methyl or ethyl ester containing about 35% ester groups. By the application of heat such as by refluxing, it is possible to obtain up to 50% esterification. As pointed out above, the other esters of the propyl and butyl series normally require some heat to facilitate ester formation. Further, with these particular esters the isolation of the esterified product from the solvent is considerably more difficult than is the case with the methyl and ethyl esters due to the entrainment of the solvent in the crystals of the partial ester. It is, however, possible to isolate the solid partial esters by employing suitable open pans and vacuum distillation techniques for removing the alcohol solvent. The solid esters so obtained may then be dissolved in the preferred alcoholic solvents, and in particular ethyl alcohol, for use in the preparation of the aerosol formulations of this invention. The partial methyl ester which is formed in methyl alcohol can be recovered from this solvent when the latter is undesirable by drowning in water. Of course, it is also possible to recover the solid methyl ester and also, if desired, the ethyl ester by evaporation of the methyl or ethyl alcohol. It is also possible to employ not only the single esters but a mixture of esters by employing as the esterifying medium a mixture of the corresponding alcohols. The partial esters are then stabilized in the manner described above with any of the aforementioned bases by adjusting the pH to a value of at least 6.5. The stabilized partial esters are then employed to effect the desired solubilization or increase in solubility of normally insoluble compounds in various polar solvents and particularly in ethyl alcohol.

As examples of compounds whose solubility may be increased in polar solvents by the use of the novel compositions of this invention are the following:

Phenyl mercuric acetate
Phenyl mercuric hydroxide
Phenyl mercuric lactate
Phenyl mercuric nitrate
Phenyl mercuric chloride
Tolyl mercuric acetate
Tolyl mercuric nitrate
Tolyl mercuric
Naphthyl mercuric acetate
Naphthyl mercuric nitrate
Naphthyl mercuric chloride
Hydroxy mercuric chlorophenol
Copper oxalate
Copper naphthenate
Copper-8-quinolinolate
Copper-3-phenyl salicylate
Ferric dimethyldithiocarbamate
Phenoxathiin
Tetramethylthiuram disulfide
N-trichloromethylthiotetrahydrophthalimide The new and useful solubilizing compositions of this invention not only have the unusual and unexpected property of solubilizing compounds of the type mentioned above, but in addition such compositions provide a means whereby such solubilized compounds may be affixed to or retained on a base by virtue of the film forming properties of the instant stabilized copolymer esters. Such an auxiliary property is extremely important and a valuable supplement to the prime property of such compositions, especially where the compounds to be solubilized are fungicides, herbicides, and the like. It is evident that the effectiveness and usefulness of the latter classes of compounds is dependent upon the ability of the compounds to withstand the normal environment conditions to which they would be exposed in normal usage. It is thus extremely advantageous to provide a film former, and again, preferably a transparent one, to bind and retain these compounds to the material to which they have been applied. It is also desirable and at times necessary that the film former be one which can be readily removed. The partial esters of the copolymers herein described meet all of these specifications. These copolymeric esters give excellent films which are transparent, which films are not destroyed by rain or garden type of watering but which may be easily removed at any time with aqueous solutions or water having a pH on the alkaline side.

It was further completely unexpected that even though the compositions of this invention produce the desired solubilizing effects in such solvents as ethyl alcohol, the resultant alcoholic solution would be compatible with the usual aerosol propellant formulations to the extent that there results a completely homogeneous solution of all of the materials present. The following examples will serve to illustrate the compositions and processes of this invention without being deemed limitative thereof. In said examples parts means parts by weight unless otherwise indicated.

*Example 1*

2.5 g. of N-trichloromethylthiotetrahydrophthalimide (this compound is completely insoluble in ethyl alcohol even upon prolonged heating with stirring) is added to 100 g. of a 10% solution of the partial "stabilized" ethyl ester of the copolymer of vinyl methyl ether and maleic anhydride in ethyl alcohol. The mixture is heated to about 80° C. for 20 minutes and there results a clear, stable, yellow solution. [The ester copolymer solution is one which contains 35% ethyl ester groups in the copolymer and is prepared by dissolving a copolymer of vinyl methyl ether and maleic anhydride, characterized by having a specific viscosity of 0.5, in absolute alcohol. Sufficient triethylamine is then added until the pH is 6.5, resulting in the "stabilized" composition.]

To illustrate the use of the above solubilized fungicide 10 parts of the above described solution containing the fungicide is mixed with 10 parts of Freon No. 112. A compatible solution results. This solution is placed in a standard aerosol can and cooled by means of an acetone-Dry Ice bath. Thereafter 19 parts of Freon No. 12 are added and the container sealed. After reaching room temperature the aerosol composition was tested and found to give an excellent spray of clear, compatible liquid which dried to a film containing the fungicide with its activity unimpaired.

*Example 2*

10 parts of the stabilized solution described above and containing 2½% of the sulfur fungicide of Example 1 is tested for compatibility and operability with another propellent formulation by placing said 10 parts of solution in a standard aerosol container. The latter is sealed and then while at room temperature there is introduced under pressure 16 parts of Freon No. 12 and 4 parts of Freon No. 11. The product is tested as in Example 1 and gives, as in that example, a clear, compatible liquid which dries to a flexible adherent film.

*Example 3*

A 5% solution of a stabilized partial ethyl ester of a copolymer of vinyl methyl ether and maleic anhydride in ethyl alcohol is prepared as follows: 5 g. of a copolymer of vinyl methyl ether and maleic anhydride (specific viscosity 0.7) is dissolved in 100 g. of ethyl alcohol. The resulting solution is refluxed gently for 20 minutes. In this manner a solution of the partial ethyl ester of the aforementioned copolymer is produced. This ester contains approximately 50% of the acid groups converted to the ethyl ester. 4 g. of triethylamine is added to bring the pH up to at least 7.0.

To the above described stabilized ester copolymer solution there is added 2.5 g. of N-trichloromethylthiotetrahydrophthalimide. The mixture is heated on a steam bath for 30 minutes and the result is a clear, stable, yellow solution. The product is tested in an aerosol formulation as described in Example 1 and the same outstanding results are achieved.

*Example 4*

The procedure of Example 1 is repeated in so far as the preparation of the solubilized fungicide is concerned except that 4 g. of the latter are employed to give correspondingly a solution having a concentration of 4% of this compound. The product is tested in the aerosol formulation described in Example 1 and again the same excellent results are obtained.

*Example 5*

To 100 g. of a 5% solution of the stabilized partial copolymer ester described in Example 3 there is added 3 g. of phenyl mercuric acetate. The mixture is heated on a steam bath for 1 hr. to form a clear, stable solution. This composition is tested in the aerosol formulation described in Example 1 and gives an excellent usable spray.

*Example 6*

A 15% solution of a stabilized partial n-butyl ester of a copolymer of vinyl methyl ether with maleic anhydride is prepared as follows: 15 g. of the maleic anhydride copolymer is dissolved in 100 g. of n-butyl alcohol. The mixture is heated for 45 minutes under gentle reflux. A partial butyl ester of the copolymer results wherein approximately 40% of the anhydride groups are converted to butyl ester groups. Sufficient sodium methylate is added to raise the pH of the resultant solution to 6.5. The unesterified copolymer has a specific viscosity of 2.0.

To the above described solution there is added 2 g. of phenyl mercuric chloride which mixture after heating on a steam bath for 30 minutes forms a clear, stable solution. This solution is tested in the aerosol formulation described in Example 1 and the results are again comparable to those obtained in that example.

*Example 7*

To 100 g. of ethyl alcohol there are added 20 g. of powdered copolymer of vinyl ethyl ether with maleic anhydride (specific viscosity 1.1), 2 g. of tetramethylthiuram disulfide and 10 g. of triethylamine. The mixture is heated with stirring on a steam bath for 1 hour and results in a clear, stable solution. This solution is employed to prepare aerosol formulations as described in Examples 1 and 2, and when tested are found to give excellent results.

*Example 8*

Example 7 is repeated except that 3.0 g. of hydroxy mercuric chlorophenyl is employed in lieu of the disulfide of Example 7. The results are comparable to said example.

*Example 9*

Example 7 is again repeated except that 5.0 g. of copper oxalate are employed in lieu of the disulfide of Example 7. Again, the results are similar to those obtained in Example 7.

*Example 10*

To 100 g. of n-butyl alcohol there are added 1 g. of a copolymer of vinyl ethyl ether with maleic anhydride (specific viscosity 1.3), 0.5 g. of the fungicide of Example 1 and 1 g. of sodium ethylate. The mixture is heated with stirring on a steam bath for 40 minutes and results in a clear, stable solution. Aerosol formulations employing this solution are prepared in the manner described in Example 1 and the results are comparable thereto.

*Example 11*

A partial n-butyl ester of a copolymer of vinyl methyl ether with maelic anhydride is prepared as follows: 10 g. of a maleic anhydride copolymer (specific viscosity 1.5) is dissolved with gentle heating in 100 g. of n-butyl alcohol. The mixture is heated under reflux for about 1 hr. The resulting solution is then vacuum stripped to remove the solvent, n-butyl alcohol. The residue is a partial butyl ester in powdered form containing approximately 45% butyl ester groups. 2.5 g. of the above described partial butyl ester is added to 100 g. of ethyl alcohol. 2.5 g. of N-trichloromethylthiotetrahydrophthalimide and 5 g. of triethylamine are additionally added. The mixture is then heated with stirring on a steam bath for 1 hr. to give a clear, stable, yellow solution.

An aerosol formulation is prepared in the manner described in Example 2 and the results obtained are comparable thereto.

*Example 12*

A partial butyl ester is prepared in the manner described above in Example 11. 10 g. of the powdered ester so prepared is added to 100 g. of ethyl alcohol. Additionally, 2 g. of tetramethylthiuram disulfide and 6 g. of triethylamine are added. The mixture is then heated with constant stirring on a steam bath for about 1 hr. and there results a clear, stable solution. This solution is then employed to prepare aerosol formulations of the type described in Examples 1 and 2, and are found to give excellent results.

*Example 13*

A 10% solution of a stabilized partial isopropyl ester of a copolymer of vinyl methyl ether with maleic anhydride in isopropanol is prepared by dissolving 10 g. of the unesterified copolymer (specific viscosity 0.6) in 100 g. of isopropanol and then refluxing the mixture for ½ hr. The resultant partial ester contains approximately 35% ester groups. Sufficient sodium ethylate is added to give a pH to the resulting solution of 7.0. To this solution is then added 2 g. of N-trichloromethylthiotetrahydrophthalimide. The mixture is then heated for 1 hr. on a steam bath whereby a clear, stable solution is formed. Excellent aerosol preparations are obtained when compounded in the manner described in Examples 1 and 2.

*Example 14*

A partial isopropyl ester as described in Example 13 is prepared and isolated as the dry powder from the isopropanol by drowning the solution of said ester in the solvent in about 5 volumes of water. The resultant precipitate is separated from the aqueous solution by filtration and then dried. 10 g. of the dried product so produced is then dissolved in 100 g. of ethyl alcohol. To this solution there is then added 3 g. of N-trichloromethylthiotetrahydrophthalimide and sufficient sodium methylate to give a pH of 7.0. The mixture is heated on a steam bath for 45 minutes and results in a clear, stable solution. Aerosol formulations are prepared as described in Examples 1 and 2 and the results thereof are comparable to those obtained in said examples.

*Example 15*

15 g. of a partial isopropyl ester prepared as described in Example 14 except that the unesterified copolymer employed is one characterized by having a specific viscosity of 1.7, is dissolved in 100 g. of ethyl alcohol. To this solution there is added 2 g. of tetramethylthiuram disulfide and 7 g. of triethylamine. Upon heating this mixture for 1 hr. on a steam bath, a clear, stable solution results.

*Example 16*

10 g. of a partial isopropyl ester prepared as described in Example 14 is dissolved in 100 g. of ethyl alcohol. To this solution there is then added 2 g. of phenyl mercuric acetate and sufficient sodium methylate to give a pH to the resultant solution of 7.0. Upon the application of heat (temperature 100° C.) for 1 hr. a clear, stable solution is produced.

*Example 17*

A partial n-propyl ester is prepared as follows: 10 g. of a copolymer of vinyl ethyl ether with maleic anhydride (specific viscosity 2.0) is dissolved in 100 g. of n-propanol. The solution is refluxed for about 1½ hrs. after which the solution is drowned in 3 volumes of water. The resulting precipitate is isolated by filtration and drying, and is found to be a partial n-propyl ester containing approximately 50% ester groups. A 10% solution of this partial ester is then prepared in 100 g. of ethyl alcohol. 1 g. of phenyl mercuric chloride and sufficient triethylamine to give a pH of 6.5 are added. The mixture is heated on a steam bath for 45 minutes whereby a clear, stable solution is obtained. An aerosol formulation is prepared in the manner described in Example 1 and an excellent spray and resulting film is obtained.

*Example 18*

A partial tertiary butyl ester is prepared as follows: 15 g. of a copolymer of vinyl ethyl ether with maleic anhydride (specific viscosity 2.2) is added to 100 g. of tertiary butyl alcohol. The mixture is refluxed for 2 hrs. and thereafter drowned in 3 volumes of water. The resulting precipitate is isolated by filtration and after drying is found to contain approximately 35% tertiary butyl ester groups. To a 5% solution of this partial ester in 100 g. of ethyl alcohol there is added 1½ g. of N-trichloromethylthiotetrahydrophthalimide and 3 g. of triethylamine. This mixture is heated on a steam bath for about 1 hr., resulting in a clear, stable solution. An aerosol preparation is made in the manner described in Example 2 and is found to yield an excellent spray and a clear film, upon drying, containing the fungicide.

The compositions and the processes of making and using same described and exemplified above are of course only illustrative of the instant invention. Various modifications of these compositions, processes and uses will be apparent to one skilled in the art and are to be deemed included within the scope of the invention as defined by the appended claims.

I claim:

1. A stabilized solution of a partial alkyl ester having from 1 to 4 carbon atoms in the alkyl radical of a copolymer of a vinyl alkyl ether having from 1 to 4 carbon atoms in the alkyl radical with maleic anhydride in a lower aliphatic alcohol of from 2 to 4 carbon atoms, said copolymer containing from about 35 to about 50% of the total acid groups converted to ester groups, said solution having a pH of at least about 6.5.

2. A solution as set forth in claim 1 wherein said aliphatic alcohol is ethyl alcohol.

3. A solution as set forth in claim 2 wherein said partial ester is an ethyl ester wherein 35% of the acid groups are ester groups.

4. A solution as set forth in claim 3 wherein the vinyl alkyl ether is a vinyl methyl ether.

5. A solution as set forth in claim 1 wherein said aliphatic alcohol is a propyl alcohol.

6. A solution as set forth in claim 5 wherein said ester is a propyl ester having at least 35% of the acid groups esterified as the propyl ester.

7. A solution having a pH of not less than about 6.5 comprising a lower aliphatic alcohol of from 2 to 4 carbon atoms, a partial alkyl ester having from 1 to 4 carbon atoms in the alkyl radical of a copolymer of a vinyl alkyl ether having from 1 to 4 carbon atoms in the alkyl radical with maleic anhydride, said partial ester containing from about 35% to about 50% ester groupings therein and a compound selected from the group consisting of heavy metal organo compounds and organo sulfur compounds, said compound being present in excess of the amount which is normally soluble in the said lower aliphatic alcohol.

8. A solution as defined in claim 7 wherein the selected compound is an organo mercury compound.

9. A solution as defined in claim 7 wherein the selected compound is N-trichloromethylthiotetrahydrophthalimide.

10. In a process for increasing the solubility of an insoluble or difficulty soluble compound in a lower aliphatic alcohol of from 2 to 4 carbon atoms the improvement which comprises adding to said lower alcohol a partial alkyl ester having from 1 to 4 carbon atoms in the alkyl radical of a copolymer of vinyl alkyl ether having from 1 to 4 carbon atoms in the alkyl radical with maleic anhydride stabilized at a pH of above about 6.5, there being present from about 35% to about 50% of the acid groups of the copolymer as ester groups.

11. The process as defined in claim 10 wherein the partial ester is an ethyl ester and the vinyl alkyl ether is vinyl methyl ether.

References Cited in the file of this patent

UNITED STATES PATENTS

| | | |
|---|---|---|
| Re. 23,514 | Voss et al. | June 24, 1952 |
| 2,752,281 | Niederhauser | June 26, 1956 |
| 2,755,280 | Feigin et al. | July 17, 1956 |